Mar. 27, 1923.                                       1,450,106.
W. E. MILLER.
ANIMAL WEANER.
FILED JUNE 15, 1922.
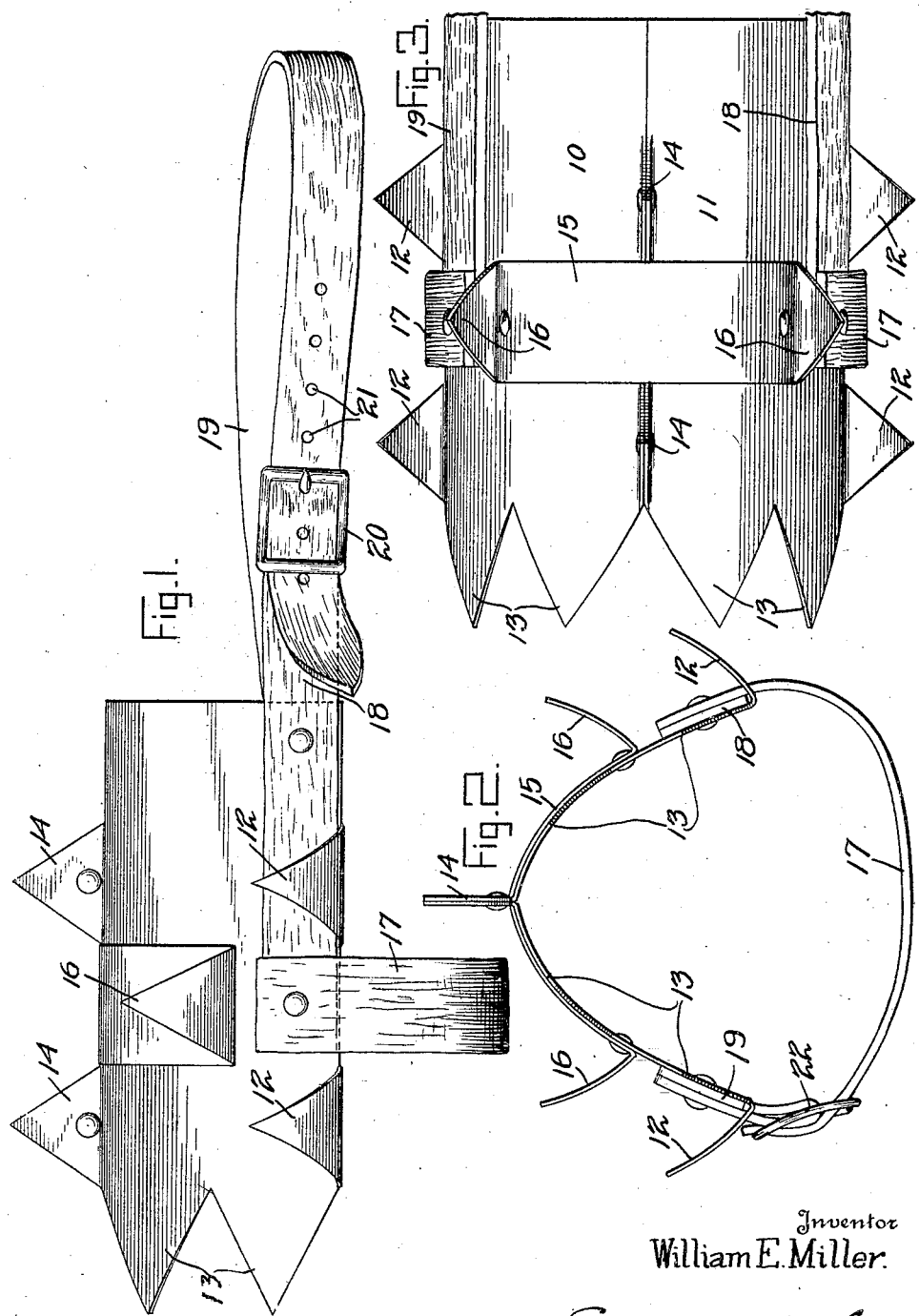
Inventor
William E. Miller.

Patented Mar. 27, 1923.

1,450,106

UNITED STATES PATENT OFFICE.

WILLIAM E. MILLER, OF KERRVILLE, TENNESSEE.

ANIMAL WEANER.

Application filed June 15, 1922. Serial No. 568,549.

*To all whom it may concern:*

Be it known that I, WILLIAM E. MILLER, a citizen of the United States, residing at Kerrville, in the county of Shelby and State of Tennessee, have invented certain new and useful Improvements in Animal Weaners, of which the following is a specification.

My said invention relates to an improved device for weaning young animals and it is an object of the invention to provide such a device which can be made at small expense and which shall be highly effective in use.

Referring to the accompanying drawings which are made a part hereof and on which similar reference characters indicate similar parts, Figure 1 is an elevation of my device viewed from one side, Figure 2 an end view of the same, and Figure 3 a plan thereof, the strap being broken away.

In the drawings reference characters 10 and 11 indicate two similar sections which are joined together at their sides to make up the body of my device. Each of these members is made of a single piece of sheet metal stamped or cut to provide laterally extending prongs or points 12—12, forwardly extending points 13 and upwardly extending points 14. Preferably rivets pass through the contacting upwardly extending points 14 on the adjacent members to hold the same together. In addition to this holding means I provide a strap 15 which extends over the two members 10 and 11 between the points 14—14 and is riveted to each of the body members. In the preferred form the strap member 15 is pointed at each end as indicated at 16 and the points are bent to extend in an upward direction. If desired the contacting points 14 may be bent apart at their ends to increase the number of prongs.

For holding the device in place I have provided a chin strap 17 which passes under the lower jaw of the animal, the parts heretofore described resting on its nose with the points 13 approximately at the end of the animal's nose or slightly in advance thereof. Straps 18 and 19 are attached to the sides of the device by means of rivets or otherwise and the strap 18 carries a buckle 20 while the strap 19 has perforations 21 at the ends to be engaged by the buckle in the well known manner, the latter strap extending over the head of the animal and passing through the buckle to hold the device up.

Having thus fully described my said invention, what I claim as new and desire to secure by Letters Patent, is:

1. An animal weaner comprising parallel sheet metal body members adapted to rest upon the nose of an animal and having upwardly extending points at their adjacent sides, rivets extending through said points to hold the parts together, the body members also having points at their outer sides and at their front ends, a strap extending over the parts between upwardly extending sets of points and riveted to both of said body members, said strap having its ends pointed and upwardly directed, a chin strap secured to the sides of the device between outwardly extending points and a head strap extending rearwardly from the device and secured to opposite sides thereof, substantially as set forth.

2. An animal weaner comprising a pair of body members each having points at opposite edges and at their front ends said body portions being connected to each other by rivets extending through contiguous points, substantially as set forth.

3. An animal weaner comprising a pair of parallel body members secured together at their meeting edges, each of said body members having points projecting upward and laterally, and means for fastening together some of the upwardly projecting points of one of the said body members to the corresponding points on the other of said body members, substantially as set forth.

4. An animal weaner comprising a pair of sheet metal body members lying side by side and having points at sides and ends, a strap extending over the body members and securing them together, said strap having pointed upturned ends, substantially as set forth.

In witness whereof, I have hereunto set my hand and seal at Kerrville, Tennessee, this 22nd day of May, A. D. nineteen hundred and twenty-two.

WILLIAM E. MILLER. [L. S.]

Witnesses:
JOHN W. FARLEY,
F. M. BAILEY.